(12) United States Patent
Clee et al.

(10) Patent No.: US 6,601,598 B2
(45) Date of Patent: Aug. 5, 2003

(54) COLLAPSIBLE SHELTER

(76) Inventors: Michael D. Clee, 131 Caldari Road, Concord, Ontario (CA), L4K 3Z9; Steve Ostrowski, 605 James Street South, Suite 300, Hamilton, Ontario (CA), L8L 1K1

( * ) Notice: Subject to any disclaimer, the term of this patent is extended or adjusted under 35 U.S.C. 154(b) by 114 days.

(21) Appl. No.: 09/804,263

(22) Filed: Mar. 13, 2001

(65) Prior Publication Data

US 2001/0035203 A1 Nov. 1, 2001

Related U.S. Application Data

(60) Provisional application No. 60/189,488, filed on Mar. 15, 2000.

(51) Int. Cl.[7] .............................................. E04H 15/48
(52) U.S. Cl. ........................ 135/143; 135/137; 135/148; 135/145
(58) Field of Search .......................... 135/121, 87, 128, 135/126, 134, 143, 116, 125, 137, 148, 151, 160, 158, 145, 131; 52/222, 63, 83; 14/71.5, 69.5

(56) References Cited

U.S. PATENT DOCUMENTS

| | | | |
|---|---|---|---|
| 4,120,067 A | * 10/1978 | Hone et al. ................. | 135/125 |
| 4,974,265 A | * 12/1990 | Maggio ....................... | 135/901 |
| 5,596,843 A | * 1/1997 | Watson ........................ | 24/294 |
| 5,682,915 A | * 11/1997 | Martin ....................... | 135/20.1 |
| 5,740,828 A | * 4/1998 | Evans ......................... | 135/132 |
| 5,967,161 A | * 10/1999 | Neal .......................... | 135/19.5 |
| 6,206,020 B1 | * 3/2001 | Lynch ......................... | 135/128 |
| 6,343,613 B1 | * 2/2002 | Yasutomi ..................... | 135/129 |
| 6,374,843 B1 | * 4/2002 | Zou ........................... | 135/143 |

FOREIGN PATENT DOCUMENTS

| | | | | |
|---|---|---|---|---|
| DE | 4417890 | * | 5/1994 | A45B/25/02 |
| GB | 2273723 | * | 12/1992 | E04H/15/46 |
| JP | 3-21779 | * | 1/1991 | E04H/15/44 |

* cited by examiner

*Primary Examiner*—Carl D. Friedman
*Assistant Examiner*—Chi Q. Nguyen

(57) ABSTRACT

The present invention a collapsible shelter comprises spaced apart first and second upright pleated wall sections disposed substantially parallel to each other, first and second slanted pleated roof sections joined at upper ends to form a saw tooth roof peak, and joined at lower ends to upper ends of said wall section to form saw tooth wall-roof junctions, wherein said pleated wall sections together with said pleated roof sections form a tunnel member which is collapsible by folding said pleated sections onto each other in accordion style. Preferably the collapsible shelter further comprising a flat floor panel having straight parallel longitudinal creases defining floor panels, each floor panel operably corresponding to a wall panel and said floor further including an axial crease along an axis running in a transverse direction; wherein said flat floor panel is connected to lower ends of said wall section (defining a tunnel section) and collapses together with said tunnel member in accordion style, to a collapsed position, by firstly folding said floor along said axial crease, prior to folding said pleated section onto each other.

14 Claims, 15 Drawing Sheets

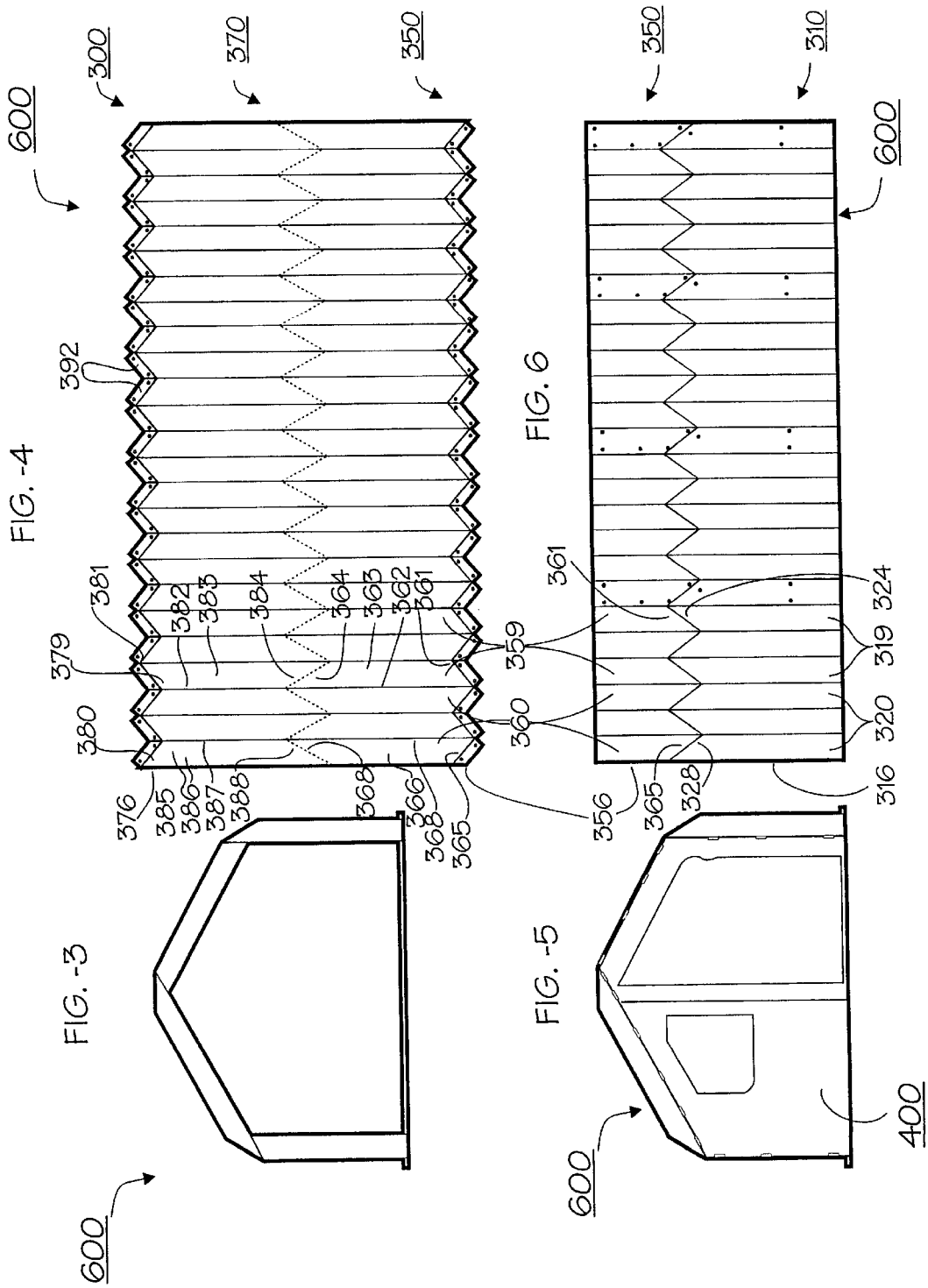

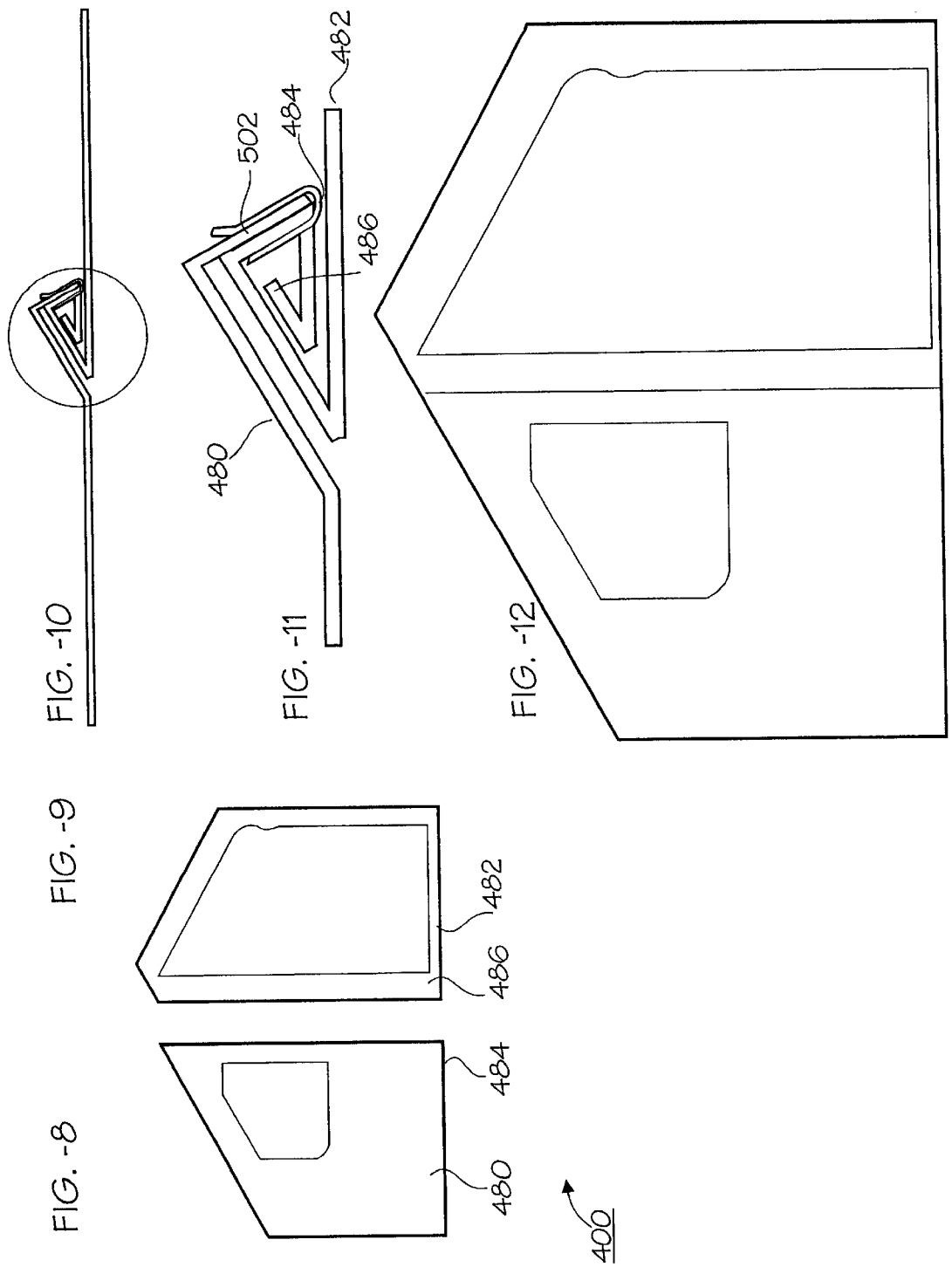

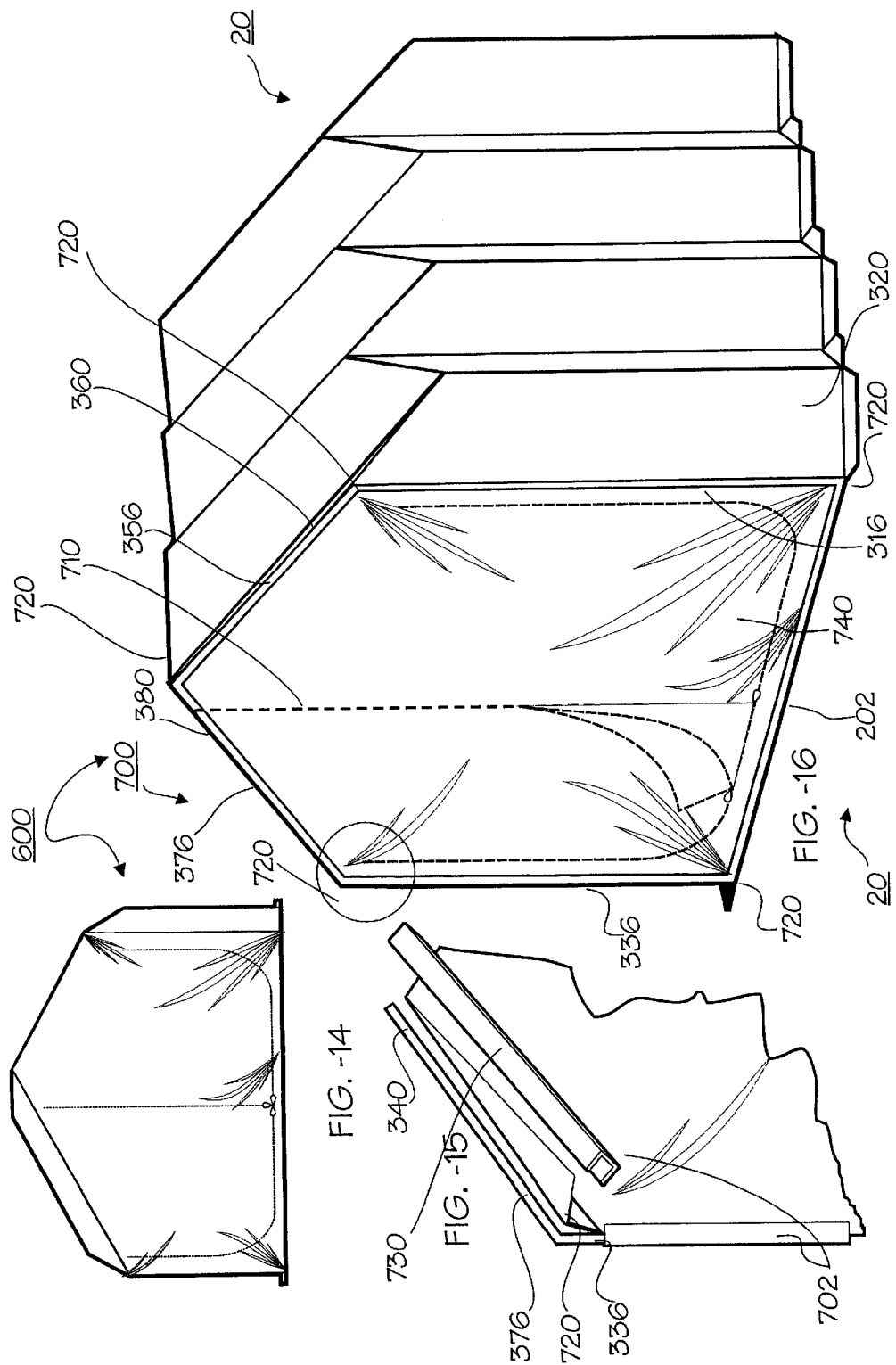

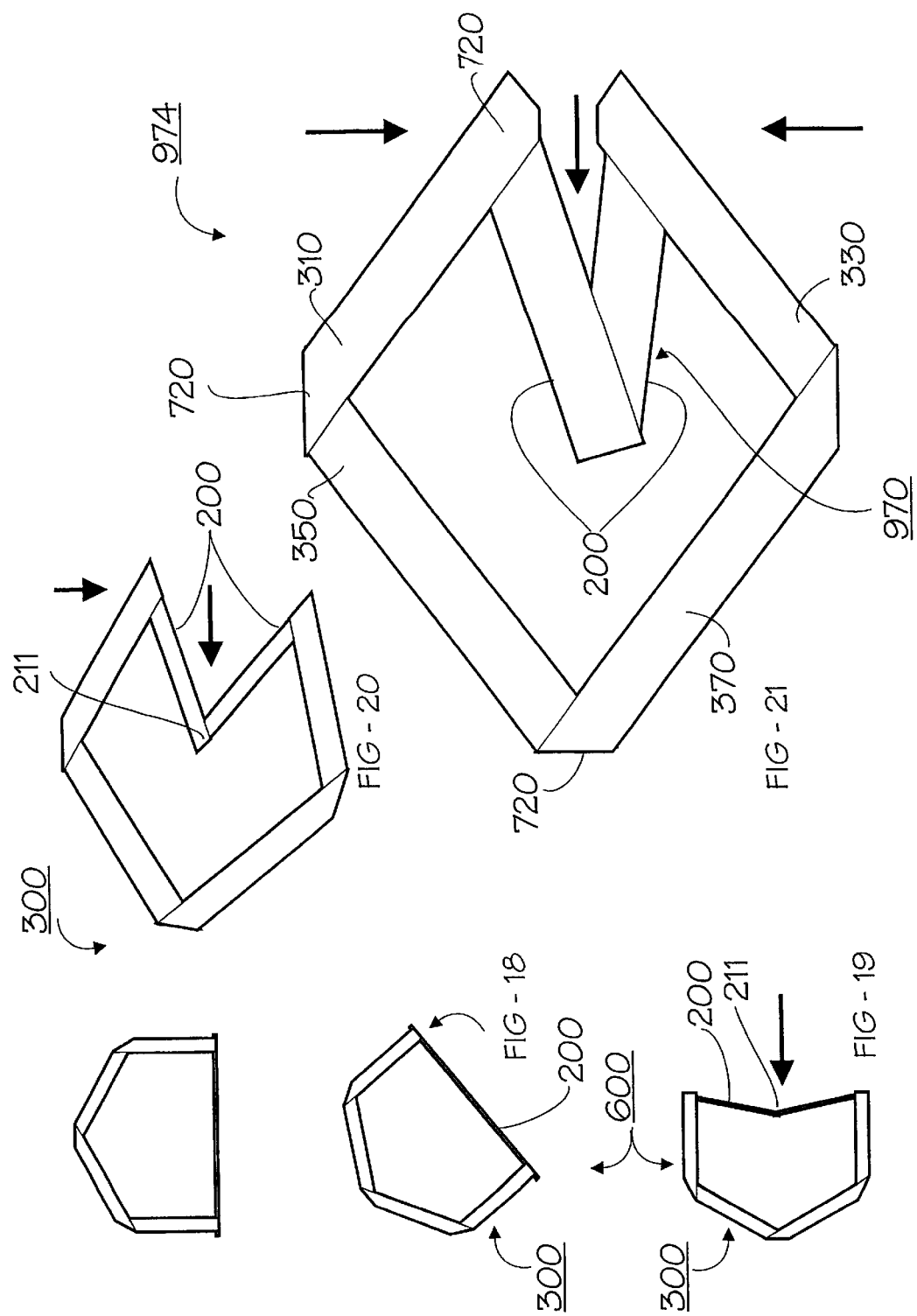

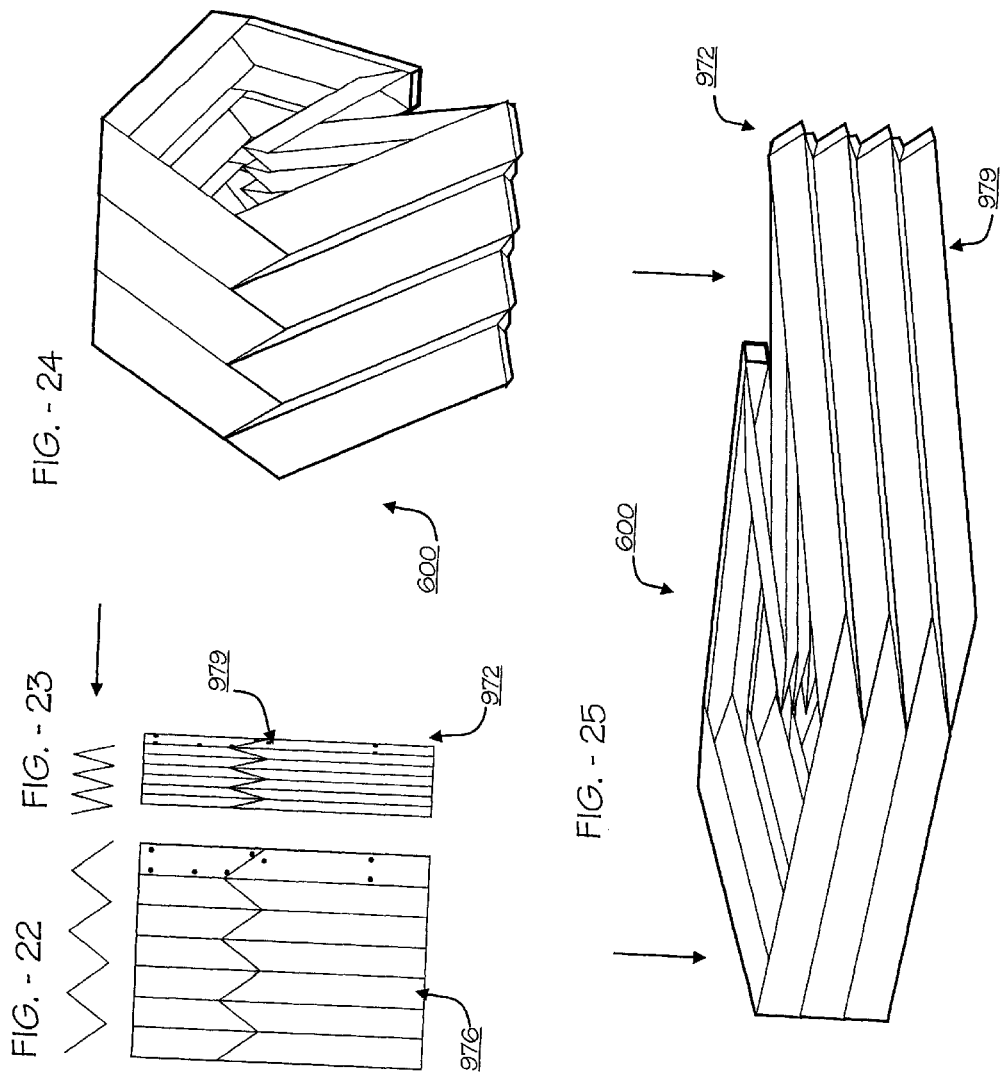

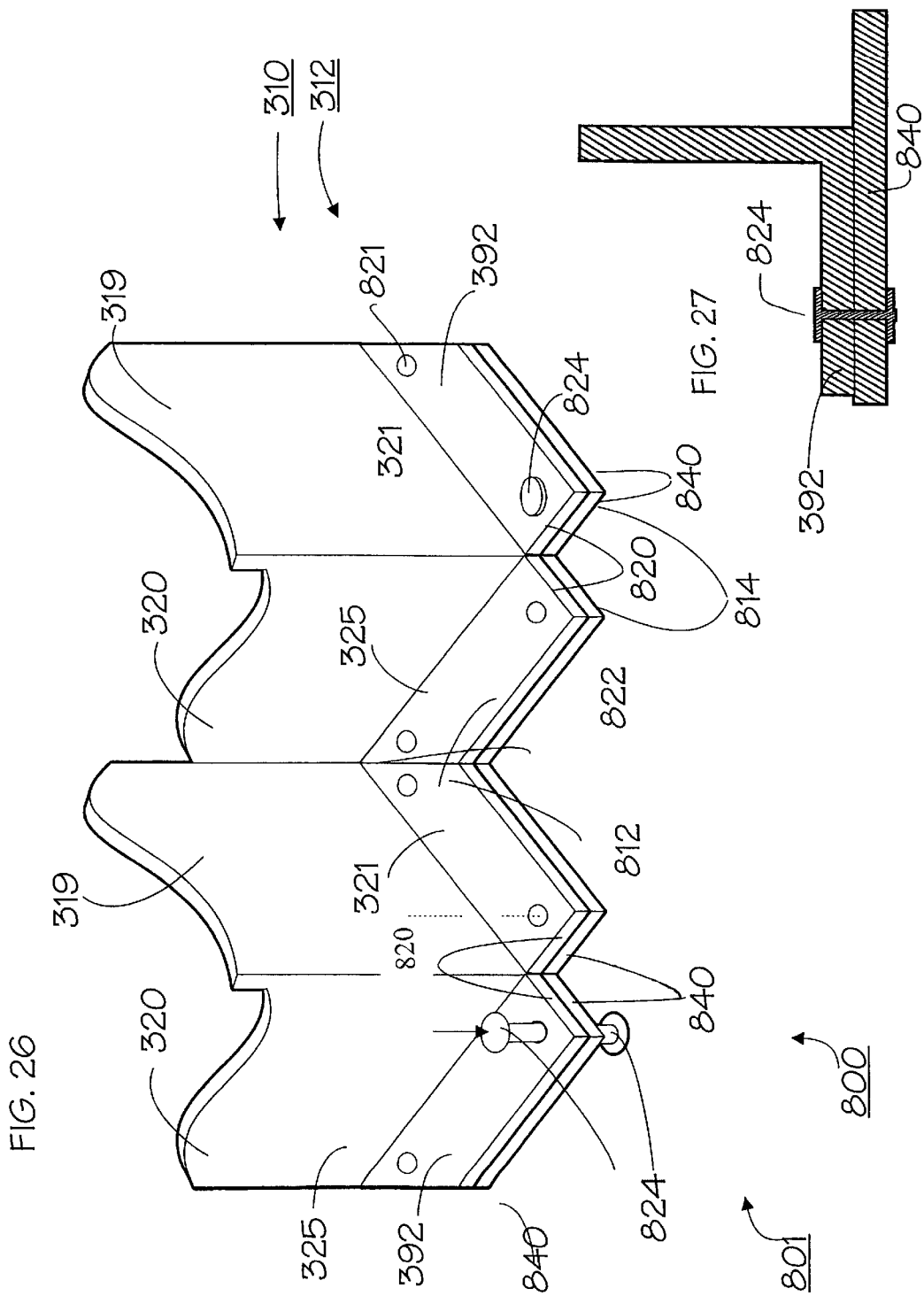

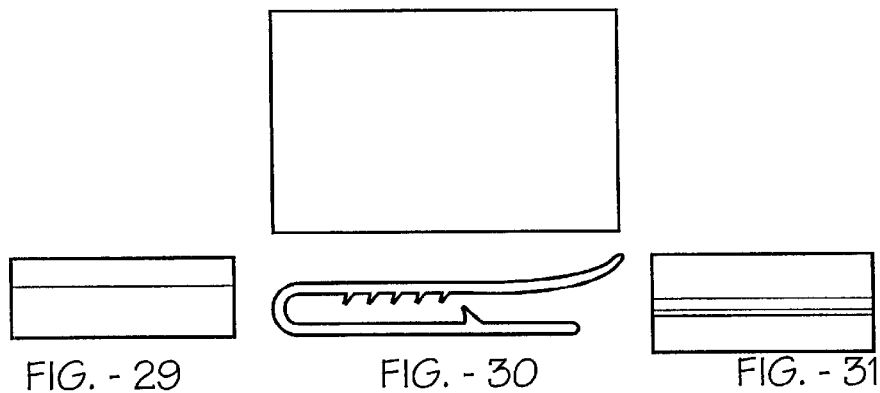
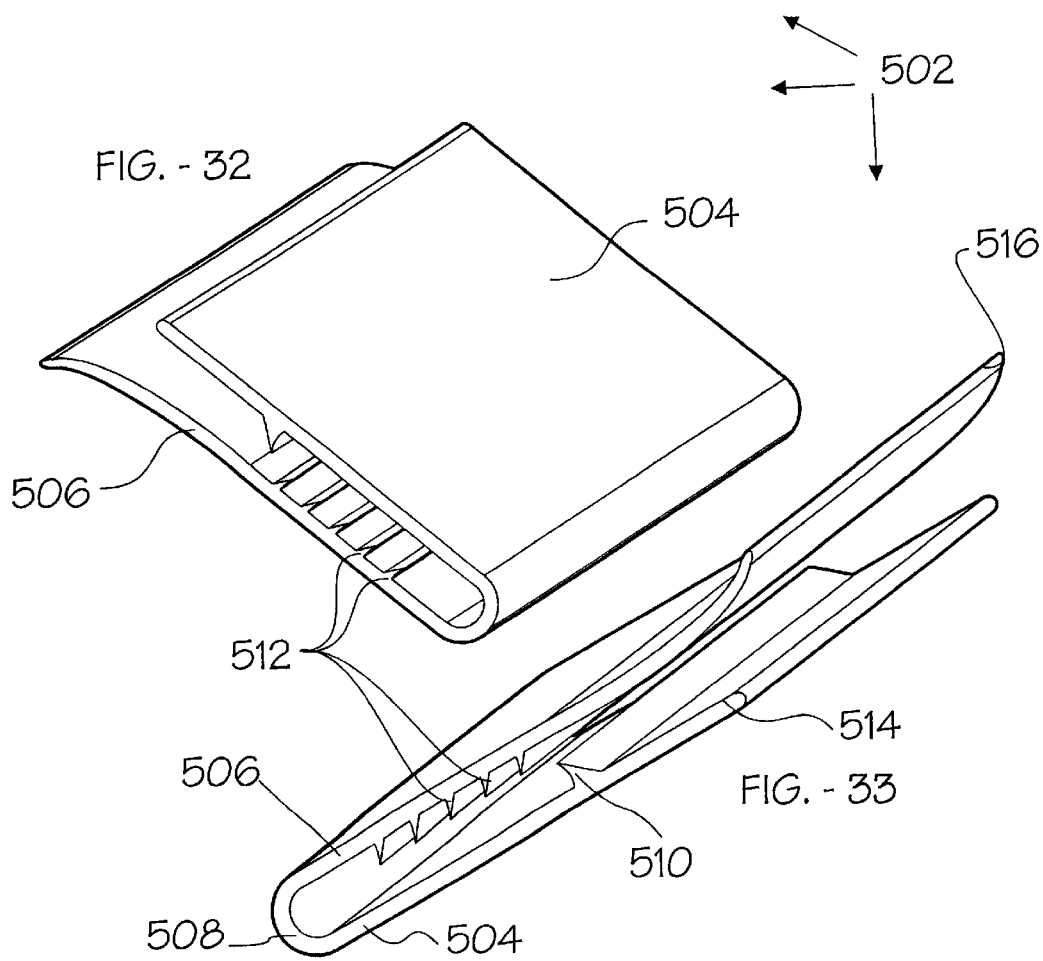

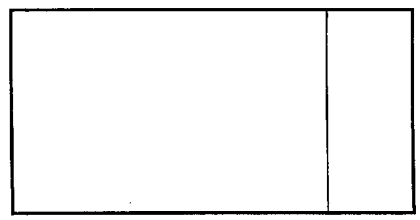
FIG. - 34
FIG. - 35  FIG. - 36  FIG. - 37
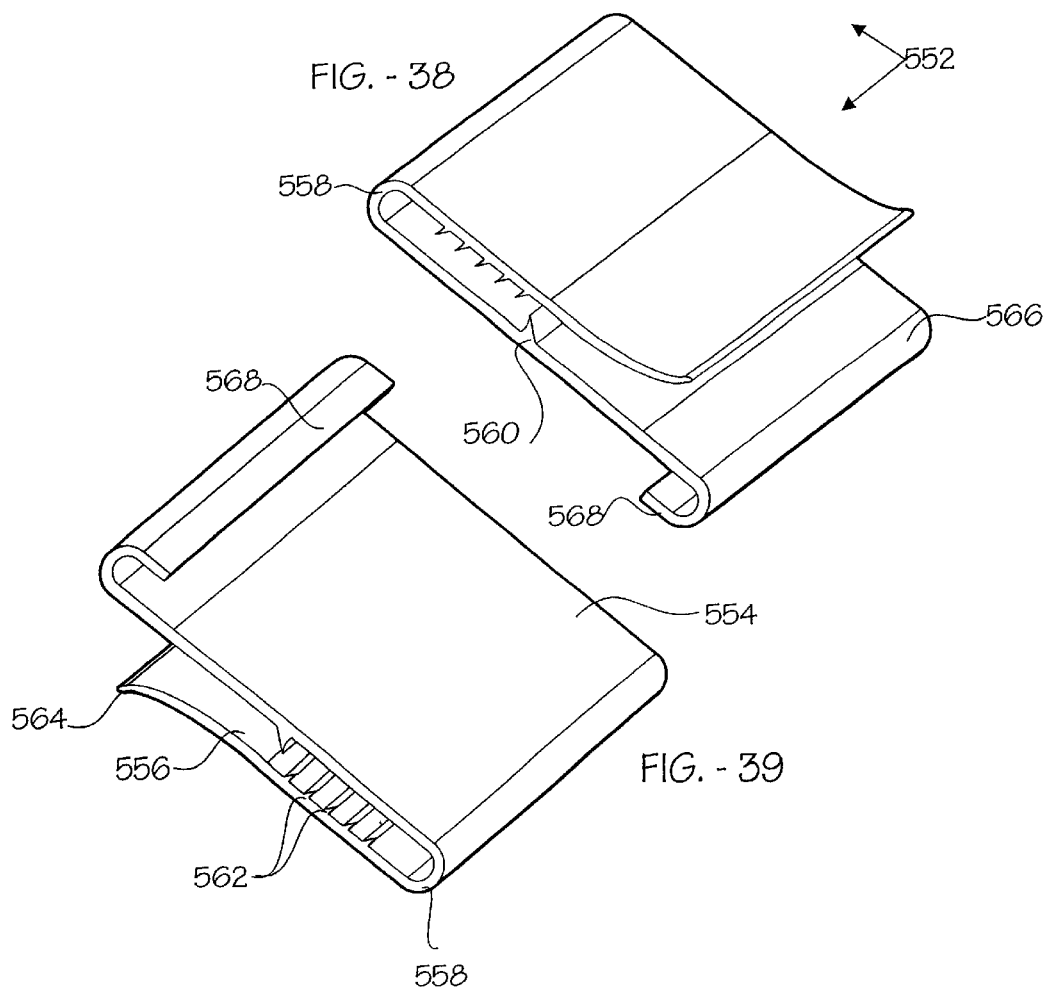
FIG. - 38
FIG. - 39

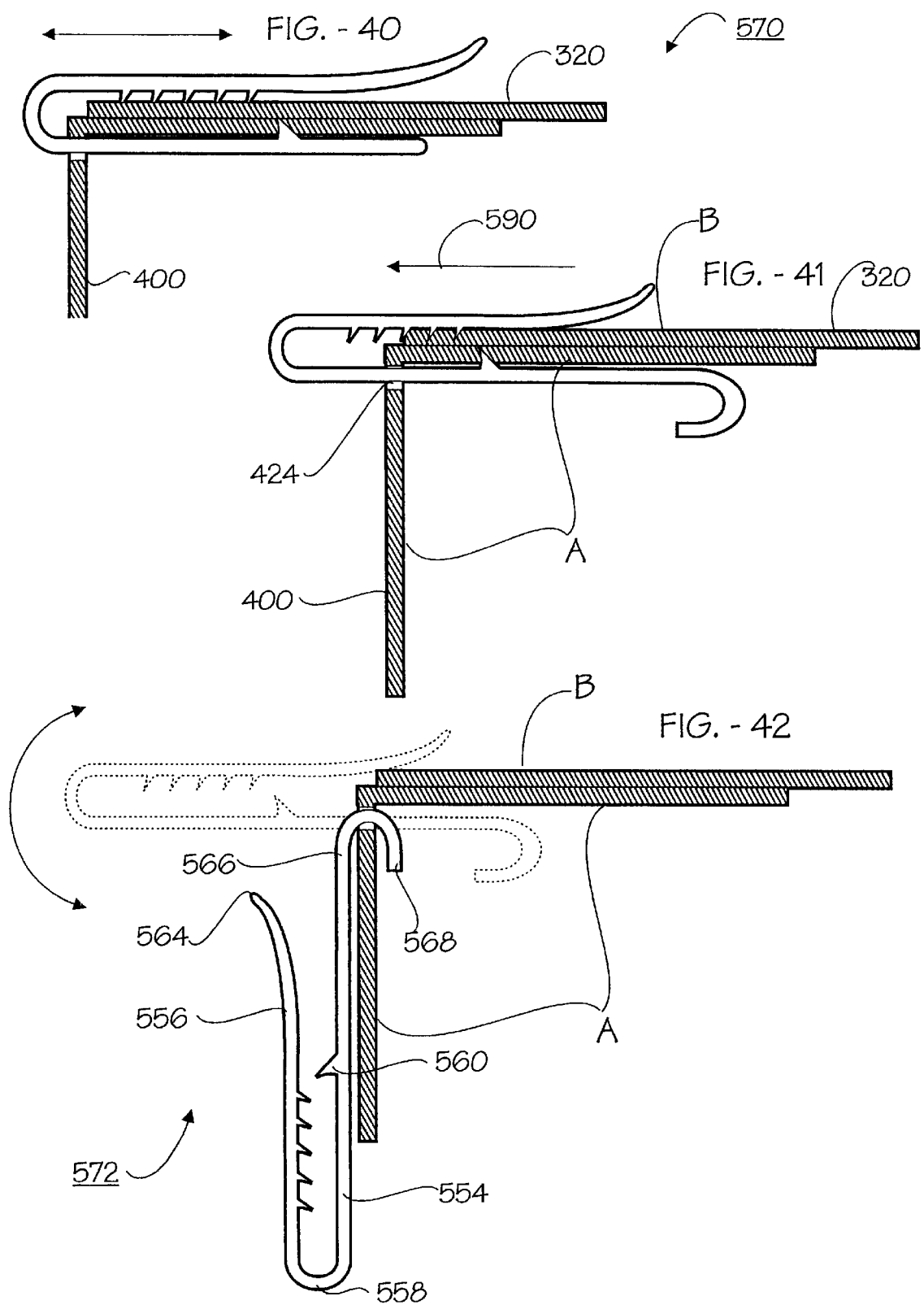

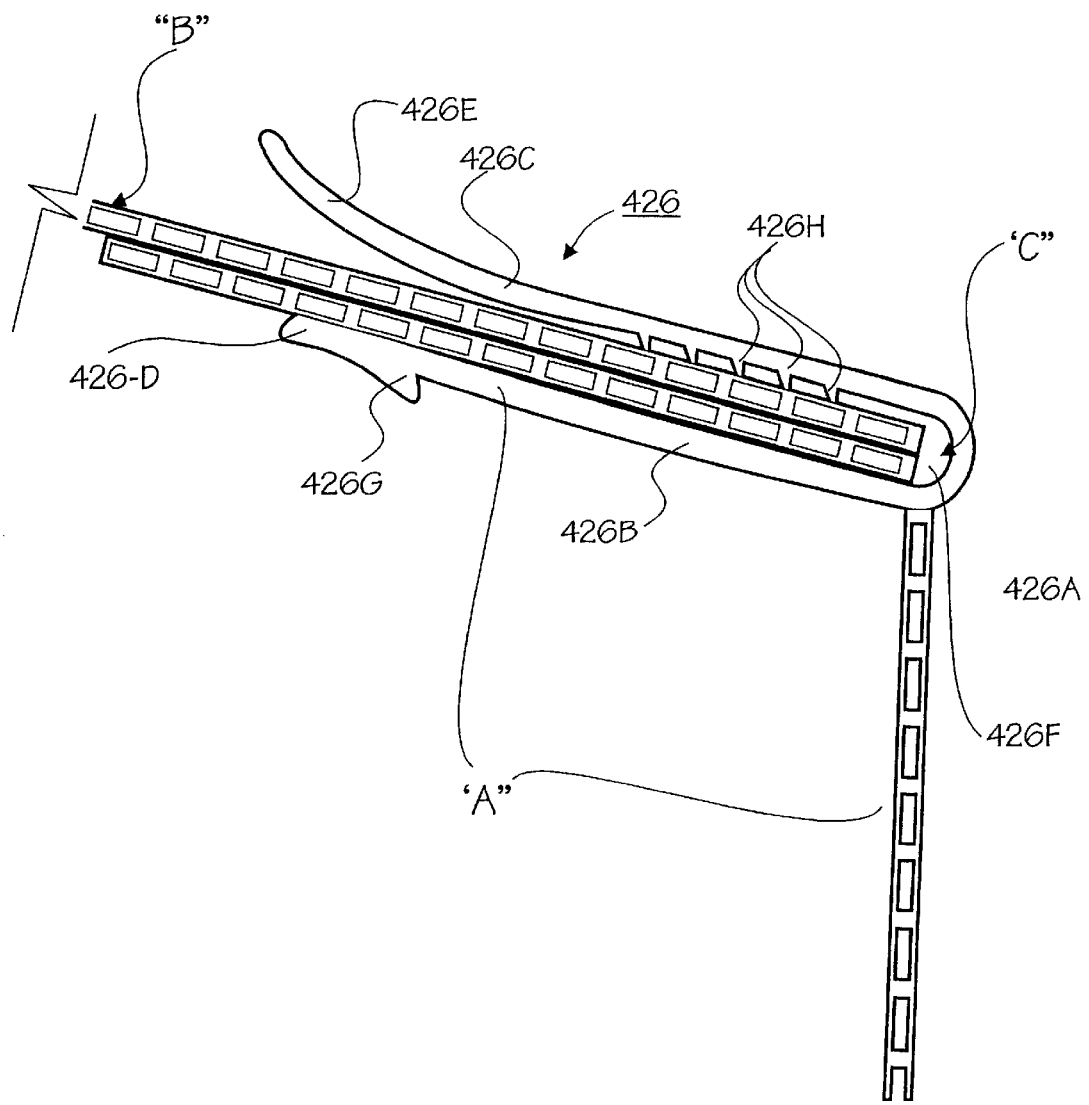

COLLAPSIBLE SHELTER

This application claims benefit of Ser. No. 60/189,488 Mar. 15, 2000.

FIELD OF THE INVENTION

This invention relates to the field of temporary housing in particularly temporarily housing which can be quickly erected and collapsed.

BACKGROUND OF THE INVENTION

Temporary shelters which are much more robust than tents have been previously designed. Such structures utilizes accordion forms made of polythene board laminated between sheets of craft paper and coated with polythene. The accordion structure is expanded into a tunnel and end panels which contain doors, windows etc. are used to maintain the form of the shelter. Without the end panels in place, the form of the structure could not be maintained. Thus the structure could be placed on a flat base such as a poured concrete floor, however if the end panels are not in place is was required to be manually supported until the end panels were fixed to the structure to maintain its shape.

While such a structure fulfilled an important need and could be erected within a matter of hours from arrival at the building site, it is not suitable for use as an emergency shelter due to the assembly and disassembly time, the need for specialty tools in order to erect the shelter and the requirement of many people to help in the erection of the shelter due to the need of the requirement of end panels to be in place in order to hold the shelters form.

Therefore, there is a need for a collapsible shelter which can be quickly and easily erected and/or collapsed by minimal man power without need for special tools and within a short period of time of less than ½ hour.

The invention is a collapsible shelter that is relatively inexpensive to purchase; that may be relatively quickly disassembled, using simple tools, into substantially flat components for subsequent flat-packing, for transportation and storage; which may be relatively quickly and easily assembled from its components using simple tools; and that is capable of withstanding extreme weather conditions.

To provide an apparatus and method whereby shelter can be quickly and relatively inexpensively provided to persons in need of same.

SUMMARY OF THE INVENTION

The present invention a collapsible shelter comprises:
(a) spaced apart first and second upright pleated wall sections disposed substantially parallel to each other;
(b) first and second slanted pleated roof sections joined at upper ends to form a saw tooth roof peak, and joined at lower ends to upper ends of said wall section to form saw tooth wall-roof junctions;
(c) wherein said pleated wall sections together with said pleated roof sections form a tunnel member which is collapsible by folding said pleated sections onto each other in accordion style.

Preferably the collapsible shelter includes:
(a) a flat floor panel having straight parallel longitudinal creases defining floor panels, each floor panel operably corresponding to a wall panel;
(b) said floor further including an axial crease along an axis running in a transverse direction;
(c) wherein said flat floor panel is connected to lower ends of said wall section (defining a tunnel section) and collapses together with said tunnel member in accordion style, to a collapsed position, by firstly folding said floor along said axial crease, prior to folding said pleated section onto each other.

Preferably wherein said floor panel is attached to said wall sections exterior to said tunnel member creating an outside wall to floor attachment.

Preferably wherein said floor panel is attached to outside flap portions pivotally connected to said lower ends of said wall sections.

Preferably wherein said wall to floor attachment comprises:
(a) flap portions defined along lower ends of said wall panels,
(b) corresponding mounting portions defined proximate saw tooth side edges of said floor panel, whereby said flap portions are fastened to said mounting portions.

Preferably, wherein said mounting portions are separated by alternate inner and outer v corners along each saw tooth side edge.

Preferably, wherein said flap portions and mounting portions correlate and match adjacently together and include fasteners there through for securing said tunnel member to said floor panel.

Preferably wherein said collapsible shelter is collapsed by:
(a) folding in half said floor panel along said axial crease such that said floor halves fold inwardly into the interior of said tunnel member into a floor folded position;
(b) folding together said pleated wall and roof sections and said floor panels in accordion fashion until all wall, roof, and floor panels are stacked upon each other creating a compact portable collapsed shelter, in said collapsed.

Preferably, further comprising at least one soft end wall secured to a front edge of said floor wall and roof sections, such that said end wall is flexible and attached in such a manner that it remains attached in the collapsed position.

Preferably wherein said soft end wall is attached with u-channel frame portions clamping together flexible material of said soft end wall and front edges of said walls, roof and floor without interfering with collapsibility of said shelter.

Preferably, wherein said U-channel frame portions define soft corners to aid in collapsing of shelter.

Preferably, further comprising at least one rigid end wall secured to a front edge of said floor with wall flap portions and clip members clamping said flap portions to said wall, roof or floor panels.

Preferably, wherein said clip member being U shaped having a first arm passing through a clip slot in said rigid end wall clamping onto said flap portion of said wall and a second arm clamping onto said wall roof or floor panel such that said flap portion and tunnel panel are clamped together.

Preferably, wherein preferably said clip member includes rubberized barbs attached to at least one of said arms for gripping securely within said U-channel said panels.

Preferably wherein preferably said first arm includes a hooked portion at a second end such that in an unfastened position said hooked portion retains said clip member partially within said clip slot.

BRIEF DESCRIPTION OF THE DRAWINGS

FIG. 3 is a schematic front elevational view of tunnel section 600 in the erected position.

FIG. 4 is a schematic top plan view of tunnel section 600 showing the first and second pleated roof sections.

FIG. 5 is a front schematic elevational plan view of tunnel section 600 showing end wall 400 in place.

FIG. 6 is a schematic side elevational plan view of tunnel section 600 showing first upright pleated wall section and first pleated roof section.

FIG. 8 shows the window panel of first end wall.

FIG. 9 shows the door panel of first end wall.

FIG. 10 shows the attachment of window panel to door panel.

FIG. 11 shows the detail of the connection between window panel and door panel.

FIG. 12 is a front elevational schematic view of first end wall 400 showing window panel connected to door panel.

FIG. 14 is a schematic front elevational view of tunnel section 600 with a soft end wall in place.

FIG. 15 is a partial cut away schematic view of the frame portions and u-channel of soft end wall 700 attaching to the tunnel section 600.

FIG. 16 is a schematic perspective view of collapsible shelter 20 including tunnel section 600 having a tunnel member 300 attached to a floor section 200 and having a soft end wall 700 mounted in one end thereof.

FIG. 18 is a schematic front elevational view of tunnel section 600 shown being tilted onto one of the side walls.

FIG. 19 is a schematic front elevational view of tunnel section 600 showing how floor section 200 is folded along axial crease 211 in order to initiate the collapsing of tunnel member 600.

FIG. 20 is a schematic end view of tunnel member 600 showing it in the partially collapsed position.

FIG. 21 is a schematic end view of tunnel member 600 showing it in the partially collapsed position.

FIG. 22 is a schematic side elevational view of tunnel member 500 showing it in the erected position.

FIG. 23 is a side schematic elevational view of tunnel member 600 in the collapsed position.

FIG. 24 is a schematic perspective view of tunnel member 600 in the partial collapsed position.

FIG. 25 is a schematic perspective view of tunnel member 600 in the almost totally collapsed position.

FIG. 26 is a partially cut away exploded perspective view of the portion of lower end of first upright pleated wall section meeting with floor section, thereby providing the wall to floor attachment details.

FIG. 27 is a cross-sectional view taken through one of the flap portions including one of the fasteners.

FIG. 28 is a top plan view of a clip member.

FIG. 29 is a end view of a clip member.

FIG. 30 is a cross sectional view of the clip member.

FIG. 31 is a elevational end view of the clip member.

FIG. 32 is a bottom perspective view of a clip member.

FIG. 33 is a end perspective view of the clip member.

FIG. 34 is a top plan view of a clip member.

FIG. 35 is a end view of a clip member.

FIG. 36 is a cross sectional view of the clip member.

FIG. 37 is a elevational end view of the clip member.

FIG. 38 is a bottom perspective view of a clip member.

FIG. 39 is a end perspective view of a clip member.

FIG. 40 is a schematic cross-section view of a clip member together with wall panels showing it in the fastened position.

FIG. 41 is a schematic cross sectional view of a clip member together with wall panels with the clip member being partially removed.

FIG. 42 is a schematic cross-sectional view of the clip member together with the wall panels showing the clip member in the unfastened position.

FIG. 43 is a cross sectional view of the clip member in the fastened position together with wall panels.

DETAILED DESCRIPTION OF THE PREFERRED EMBODIMENT

Figure 1:
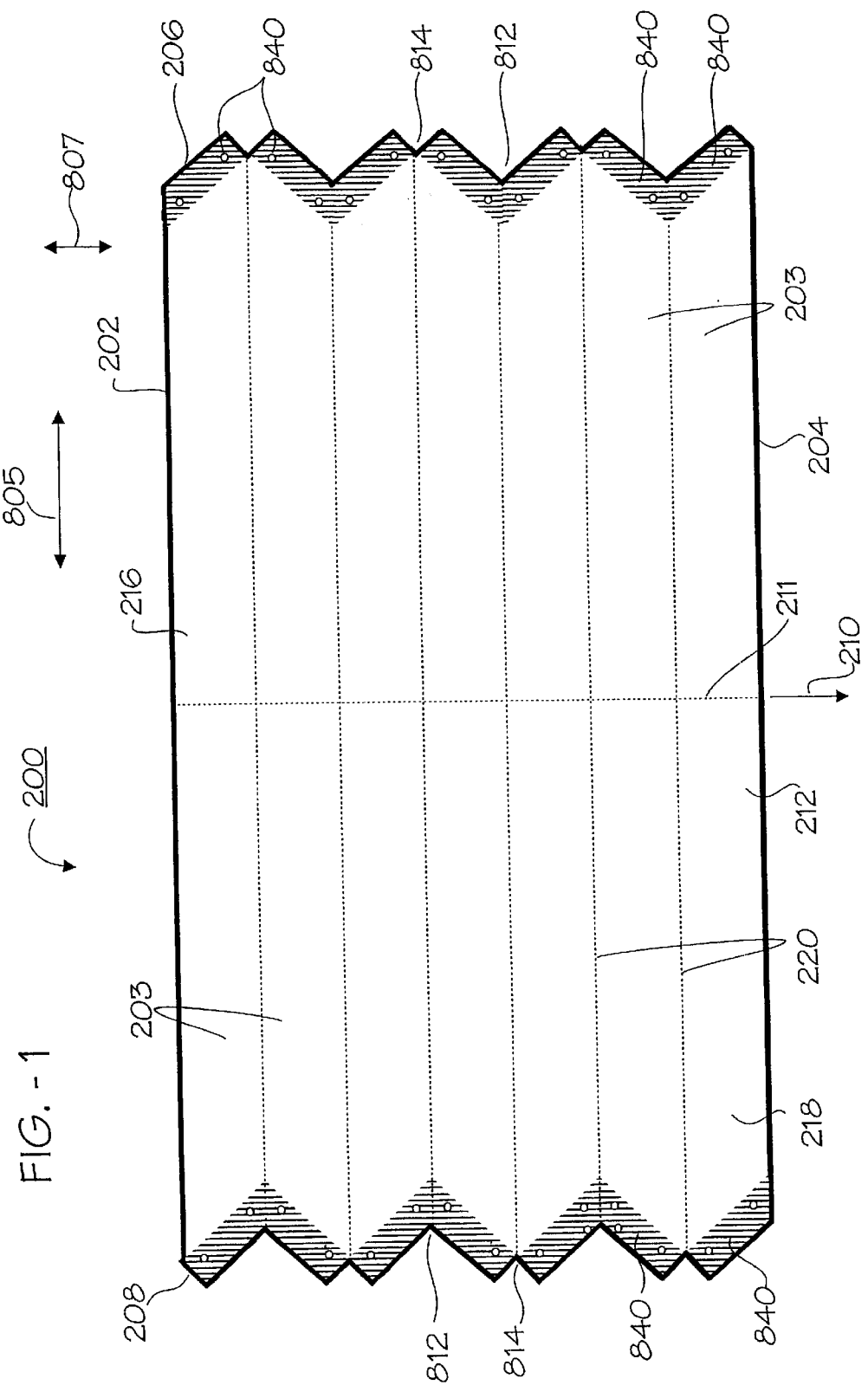
FIG. 1 is a schematic plan view of the floor section.

The collapsible shelter 20 comprises a substantially rectangular floor section 200; a tunnel member 300; a first rigid end wall 400, and a second rigid end wall (not shown). It may include soft end walls 700 in substitution for rigid end walls.

FIGS. 1 to 43 shows the COLLAPSIBLE SHELTER 20 according to a preferred embodiment of the present invention in use. It will be evident that, in use, the COLLAPSIBLE SHELTER contains a volume having substantially vertical sidewalls (defined by the first upright pleated wall section 300, the second upright pleated wall section 330, the first end wall 400 and the second end wall 500 (not shown)) and a peaked top portion (defined by the first pleated roof section 340 and the second pleated roof section 370).

Figure 2:
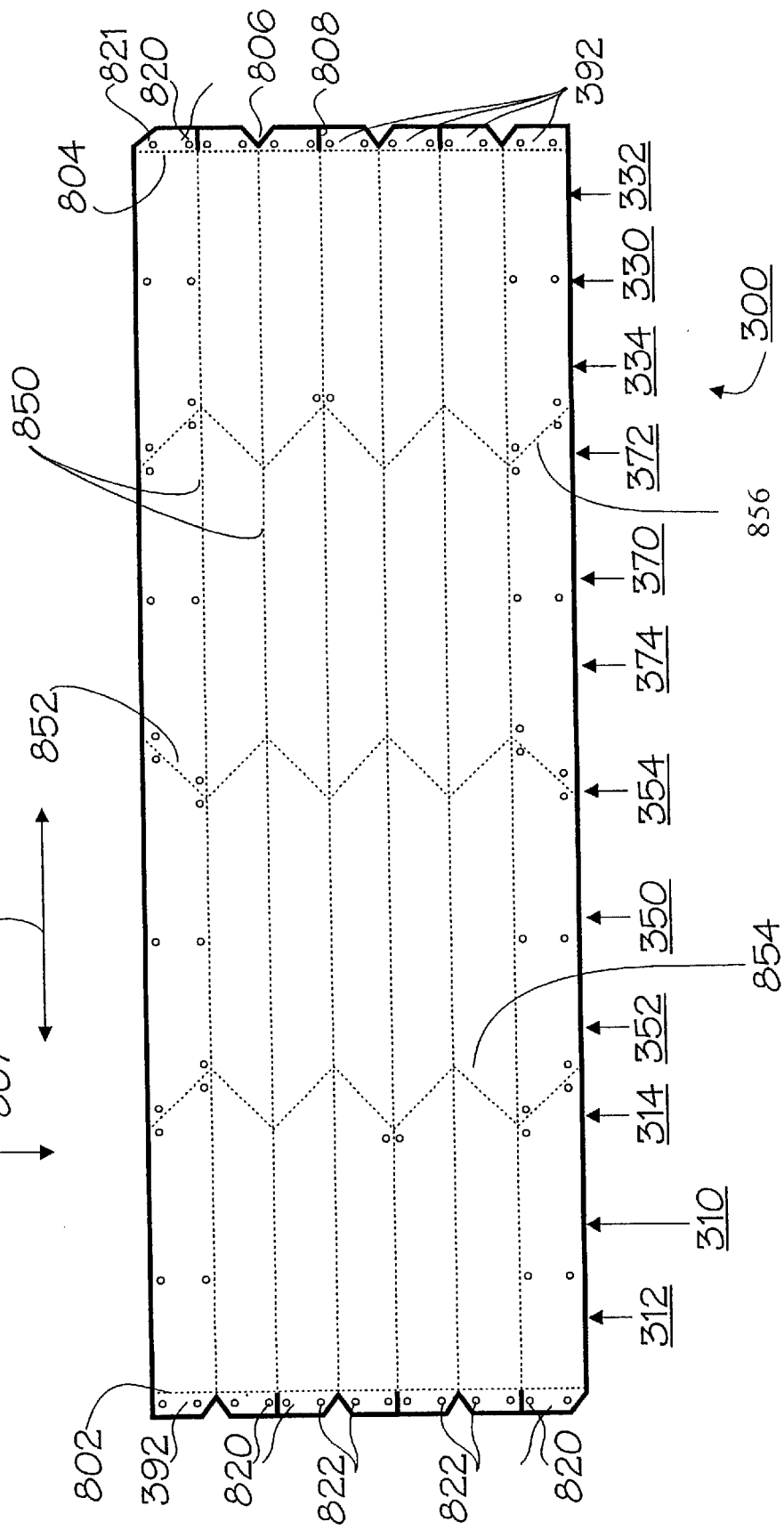
FIG. 2 is a schematic plan view of the tunnel member shown with creases and dotted lines and cuts in solid lines, the tunnel member shown in the flat position prior to being folded.
Figure 7:
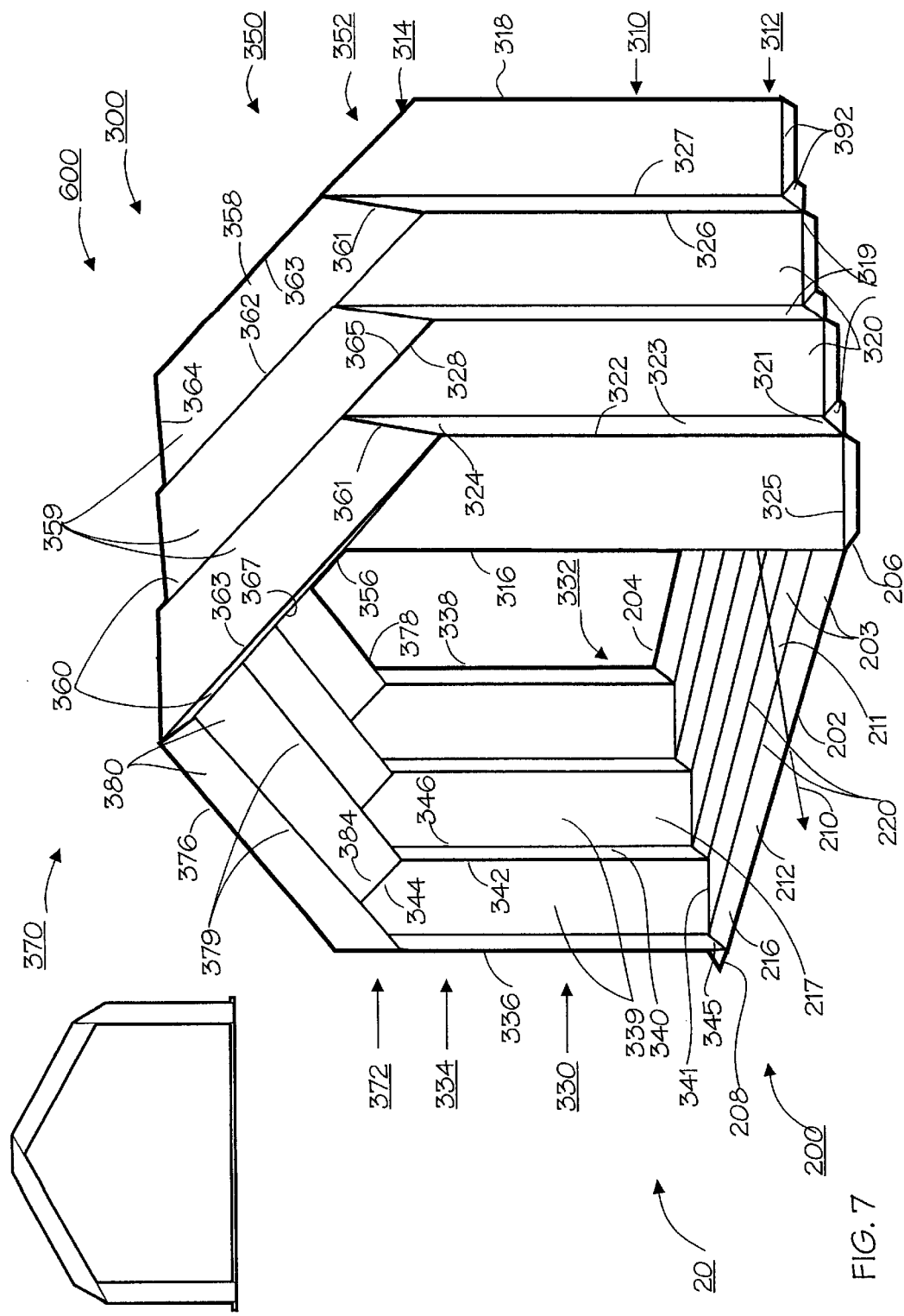
FIG. 7 is a schematic perspective view of collapsible shelter 20 showing tunnel section 600 in its erected position having tunnel member 300 attached to floor section 200.

As best shown in FIGS. 1, 2 and 7, the floor section 200 has a front edge 202; a back edge 204 spaced apart from and substantially parallel to the front edge 202; a first saw tooth side edge 206 extending from the front edge 202 to the back edge 204 and disposed substantially normally thereto; a second saw tooth side edge 208 substantially parallel to the first side edge 206 and extending from the front edge 202 to the back edge 204; an axis 210 substantially parallel to the first saw tooth side edge 206 and the second saw tooth side edge 208 and centrally disposed there between. Floor panel 200 includes an upper surface 212; and a lower surface 214 (not shown). The upper surface 212 of the floor section 200 has further defined thereon a first mounting area 216 abutting the front edge 202 of the floor section 200, and a second mounting area 218 abutting the back edge 204 of the floor section 200. The upper surface 212 of the floor section 200 has defined thereon mounting portions 840 proximate both saw tooth side edges for receiving flap portions 392 thereon. The floor section 200 has a plurality of floor creases 220 defined thereupon, each of said floor creases 220, said front edge 202 and said back edge 204 being equally spaced relative to one another thereby to define an odd plurality of substantially rectangular floor panels 203 of said floor section 200. An axial crease 211 is also defined upon said floor section 200, substantially coincident with the axis 210.

Referring now to FIGS. 1 to 17, the tunnel member 300 will be seen to comprise a first upright pleated wall section 310, a second upright pleated wall section 330, a first pleated roof section 350; and a second pleated roof section 370.

First Upright Pleated Wall Section

As best viewed in FIGS. 2 and 7, the first upright pleated wall section 310 has a lower end 312 thereof flexibly, rigidly attached to the upper surface 212 of the floor section 200 substantially parallel to and adjacent to the first side edge 206 of the floor section 200. The first upright pleated wall section 310 extends from the lower end 312 thereof to an upper end 314 thereof, said upper end 314 being substantially upwardly disposed from the lower end 312 and parallel thereto, said first upright pleated wall section 310 having a front edge 316 adjacent to the front edge 202 of the floor section 200 and a back edge 318 adjacent to the back edge 204 of the floor section 200.

As best viewed in FIGS. 2 and 7, the second upright pleated wall section 330 has a lower end 332 thereof flexibly, rigidly attached to the upper surface 212 of the floor section 200 substantially parallel to and adjacent to the second side edge 208 of the floor section 200. The second upright pleated wall section 300 extends from said lower end 332 thereof to an upper end 334 thereof, said upper end 334 being substantially upwardly disposed from the lower end 332 and parallel thereto, said second upright pleated wall section 330 having a front edge 336 extending substantially upwardly from the frond edge 202 of the floor section 200 and a back edge 338 extending substantially upwardly from the back edge 204 of the floor section 200.

The first pleated roof section 350 is best shown in FIGS. 2, 4 and 7, and will be seen to have a lower end 352 thereof flexibly, rigidly attached to the upper end 314 of the first upright pleated wall section 310. The first pleated roof section 350 extends from said lower end 352 thereof to an upper end 354 thereof disposed substantially upwardly from the axis 210 of the floor section 200, said first pleated roof section 350 having a frond edge 356 extending from the front edge 316 of the first upright pleated wall section 310 and a back edge 358 extending from the back edge 318 of the first upright pleated wall section 310.

As best seen in FIGS. 3, 4 and 7, the second pleated roof section 370 has a lower end 372 thereof flexibly, rigidly attached to the upper end 334 of the second upright pleated wall section 330. The second pleated roof section 370 extends from said lower end 372 thereof to an upper end 374 thereof substantially coincident with the upper end 354 of the first pleated roof section 350, said upper end 374 of the second pleated roof section 370 being flexibly, rigidly attached to the upper end 354 of the first pleated roof section 350, said second pleated roof section having a front edge 376 extending between the front edge 336 of the second upright pleated wall section 330 and the front edge 356 of the first pleated roof section 350 and a back edge 378 extending between the back edge 338 of the second upright pleated wall section 330 and the back edge 358 of the first pleated roof section 350.

The front edge 316 of the first upright pleated wall section 310; the front edge 356 of the first pleated roof section 350; the front edge 376 of the second pleated roof section 370; the front edge 336 of the second upright pleated wall section 300; and the back edge 204 of the floor section 200 collectively define a second substantially planar end 391 of said collapsible structure 20.

The back edge 318 of the first upright pleated wall section 310; the back edge 358 of the first pleated roof section 350; the back edge 378 of the second pleated roof section 370; the back edge 338 of the second upright pleated wall section 300; and the back edge 204 of the floor section 200 collectively define a second substantially planar end 391 of said collapsible structure 20.

The first rigid end wall 400 has a main body section 402 selectively, releasably received, in close fitting relation, within the first end 390 of the tunnel member 300, said main body section 402 being selectively, rigidly, releasably attached to said tunnel member 300 and to said floor section 200.

The second rigid wall (500) is not shown, is analogous to first rigid end wall 400 and mounted on the other end.

The first upright pleated wall section 310 comprises a plurality of first wall panels 319 and a plurality of second wall panels 320.

The first wall panels 319 each have a first end edge 321; a first side edge 322 extending substantially normally from the first end edge 321; a second side edge 323 extending from the first end edge 321, substantially parallel to the first side edge 322 and spaced-apart therefrom; and a second end edge 324 extending between the first side edge 322 and the second side edge 324 and disposed such that an angle of approximately 135 degrees is defined between the first side edge 322 and the second end edge 324.

The second wall panels 320 each have a first end edge 325; a first side edge 326 extending substantially normally from the first end edge 325; a second side edge 327 extending from the first end edge 325, substantially parallel to the first side edge 326 and spaced-apart therefrom; and a second end edge 328 extending between the first side edge 326 and the second side edge 327 and disposed such that an angle of approximately 135 degrees is defined between the first side edge 326 and the second end edge 328.

The plurality of first wall panels 319 and the plurality of second wall panels 320 are arranged in alternating side-by-side relation, with a respective one of said second wall panels 320 being positioned immediately adjacent the front edge 202 of the floor section 200 and a respective one of said second wall panels 320 being positioned immediately adjacent the back edge 204 of the floor section 200, the respective first side edges 322, 326 of adjacent ones of the first wall panels 319 and the second wall panels 320 being flexibly, rigidly attached to one another, the respective second side edges 323, 327 of adjacent first wall panels 319 and second wall panels 320 being flexibly, rigidly attached to one another.

The first side edge 326 of said respective one of the second wall panels 320 positioned immediately adjacent the front edge 202 of the floor section 200 defines said front edge 316 of the first upright pleated wall section 310.

The First Pleated Roof Section

The first pleated roof section 350 comprises a plurality of first roof panels 359 and a plurality of second roof panels 360.

The first roof panels 359 each have a first end edge 361; a first side edge 362 extending from the first end edge 361 and disposed approximately 135 degrees relative thereto; a second side edge 363 extending from the first end edge 361, substantially parallel to the first side edge 362; and a second end edge 364 extending between the first side edge 362 and the second side edge 363 and disposed such that an angle of approximately 135 degrees is defined between the first side edge 362 and the second end edge 364.

The second roof panels 360 each have a first end edge 365; a first side edge 366 extending from the first end edge 365 and disposed approximately 135 degrees relative thereto; a second side edge 367 extending from the first end edge 366 substantially parallel to the first side edge 366; and a second end edge 368 extending between the first side edge 366 and the second side edge 367 and disposed such that an angle of approximately 135 degrees is defined between the first side edge 366 and the second end edge 368.

The plurality of first roof panels 359 and the plurality of second roof panels 360 are arranged in alternating side-by-side relation, each of the first roof panels 359 being positioned in end-to-end relation with a respective one of the first wall panels 319, each of the second roof panels 360 being positioned in end-to-end relation with a respective one of the plurality of second wall panels 320, a respective one of the second roof panels 360 being positioned in said end-to-end relation with said respective one of the second wall panels 320 positioned immediately adjacent the front edge 2020 of the floor section 200, the respective first side edges 362, 366 of adjacent first roof panels 359 and second roof panels 360 being flexibly, rigidly attached to one another, the respective second side edges 363, 367 of adjacent first roof panels 369 and second roof panels 360 being flexibly, rigidly attached to one another, the first end edge 361 of said each first roof panel 359 being flexibly, rigidly attached to the second end edge 324 of the respective first wall panel 319 positioned in end-to-end relation therewith said each first roof panel 369; the first end edge 365 of said each second roof panel 360 being flexibly, rigidly attached to the second end edge 328 of the respective second wall panel 320 positioned in end-to-end relation therewith said each second roof panel 360, the second side edge 367 of said second roof panel 360 defining the front edge 356 of the said first pleated roof section 350.

The Second Pleated Roof Section

The second pleated roof section 370 comprises a plurality of third roof panels 379 and a plurality of fourth roof panels 380.

Said third roof panels 379 each have a first end edge 381; a first side edge 382 extending from the first end edge 381 and disposed approximately 135 degrees relative thereto; a second side edge 383 extending from the first end edge 381, substantially parallel to the first side edge 382; and a second end edge 384 extending between the first side edge 382 and the second side edge 383 and disposed such that an angle of approximately 135 degrees is defined between the first side edge 382 and the second end edge 384.

Said fourth roof panels 380 each have a first end edge 385; a first side edge 386 extending from the first end edge 385 and disposed approximately 135 degrees relative thereto; a second side edge 387 extending from the first end edge 385, substantially parallel to the first side edge 386; and a second end edge 388 extending between the first side edge 386 and the second side edge 387 and disposed such that an angle of approximately 135 degrees is defined between the first side edge 386 and the second end edge 388.

The plurality of third roof panels 379 and the plurality of fourth roof panels 380 are arranged in alternating side-by-side relation, each of the third roof panels 379 being positioned in end-to-end relation with a respective one of the first roof panels 359, each of the fourth roof panels 380 being positioned in end-to-end relation with a respective one of the plurality of second roof panels 360, a respective one of the fourth roof panels 380 being positioned in said end-to-end relation with the respective one of the second roof panels 360 positioned in said end-to-end relation with said respective one of the second wall panels 320 positioned immediately adjacent the front edge 202 of the floor section 202, the respective first side edges 382, 386 of adjacent third roof panels 379 and fourth roof panels 380 being flexibly, rigidly attached to one another, the respective second side edges 383, 387 of adjacent third roof panels 379 and fourth roof panels 380 being flexibly, rigidly attached to one another, the first end edge 381 of said each third roof panel 379 being flexibly, rigidly attached to the second end edge 365 of the respective first roof panel 359 positioned in end-to-end relation therewith said each third roof panel 379; the first end edge 385 of said each fourth roof panel 380 being flexibly, rigidly attached to the second end edge 368 of the respective second roof panel 360 positioned in end-to-end relation therewith said each fourth roof panel 380, the first side edge 386 of said respective one of the fourth roof panels 380 defining the front edge 376 of said second pleated roof section 370.

The Second Pleated Wall Section

The second pleated wall section 330 comprises a plurality of third wall panels 339 and a plurality of fourth wall panels 340.

The third wall panels 339 each have a first end edge 341; a first side edge 342 extending substantially normally from the first end edge 341; a second side edge 343 extending from the first end edge 341, substantially parallel to the first side edge 342 and spaced-apart therefrom; and a second end edge 344 extending between the first side edge 342 and the second side edge 343 and disposed such that an angle of approximately 135 degrees is defined between the first side edge 342 and the second end edge 344.

The fourth wall panels 340 each have a first end edge 345; a first side edge 346 extending substantially normally from the first end edge 345; a second side edge 347 extending from the first end edge 345, substantially parallel to the first side edge 346 and spaced-apart therefrom; and a second end edge 348 extending between the first side edge 346 and the second side edge 347 and disposed such that an angle of approximately 135 degrees is defined between the first side edge 346 and the second end edge 348.

The plurality of third wall panels 339 and the plurality of fourth wall panels 340 are arranged in alternating side-by-side relation, each of the third wall panels 339 being positioned in end-to-end relation with a respective one of the third roof panels 379, each of the fourth wall panels 340 being positioned in end-to-end relation with a respective one of the plurality of fourth roof panels 380, a respective one of the fourth wall panels 340 being positioned in said end-to-end relation with said respective one of the fourth roof panels 380 positioned in said end-to-end relation with said respective one of the fourth roof panels 380 positioned in said end-to-end relation with the respective one of the second roof panels 360 positioned in said end-to-end relation with said respective one of the second wall panels 320 positioned immediately adjacent the front edge 202 of the floor section 200, the respective first side edges 342,346 of adjacent third wall panels 339 and fourth wall panels 340 being flexibly, rigidly attached to one another, the respective second side edges 343, 347 of adjacent third end edge 344 of said each third wall panel 339 being flexibly, rigidly attached to the second end edge 384 of the respective third roof panel 379 positioned in end-to-end relation therewith said each third wall panel 339; the second end edge 348 of said each fourth wall panel 340 being flexibly, rigidly attached to the second end edge 388 of the respective fourth roof panel 380 positioned in end-to-end relation therewith said each fourth wall panel 340, the second side edge 347 of said respective one of the fourth wall panels 340 defining the front edge 336 of said second upright pleated wall section 330.

Flap Portions

As best seen in FIGS. 1, 4 and 7, the tunnel member 300 further comprises a plurality of flap portions 392 positioned flush against the floor section 200, adjacent to a corresponding mounting portion 840. Said plurality of flap portions 392 being flexibly attached to, and extending from each of the first end edges 321 of the first wall panels 319 towards the first side edge 206 of the floor section 200; a respective one of said plurality of flap portions 392 being flexibly attached to, and extending from each of the first end edges 325 of the second wall panels 320, towards the first side edge 206 of the floor section 200; a respective one of said plurality of flap portions 392 being flexibly attached to, and extending from each of the first end edges 341 of the third wall panels 339 towards the second side edge 208 of the floor section 200; and a respective one of said plurality of flap portions 392 being flexibly attached to, and extending from each of the first end edges 345 of the fourth wall panels 340 towards the second side edge 208 of the floor section 200. Said flap portions 392 are each rigidly attached to mounting portions 840 of the floor section 200 by conventional rivet fasteners 824, best viewed in FIG. 27.

Figure 13:
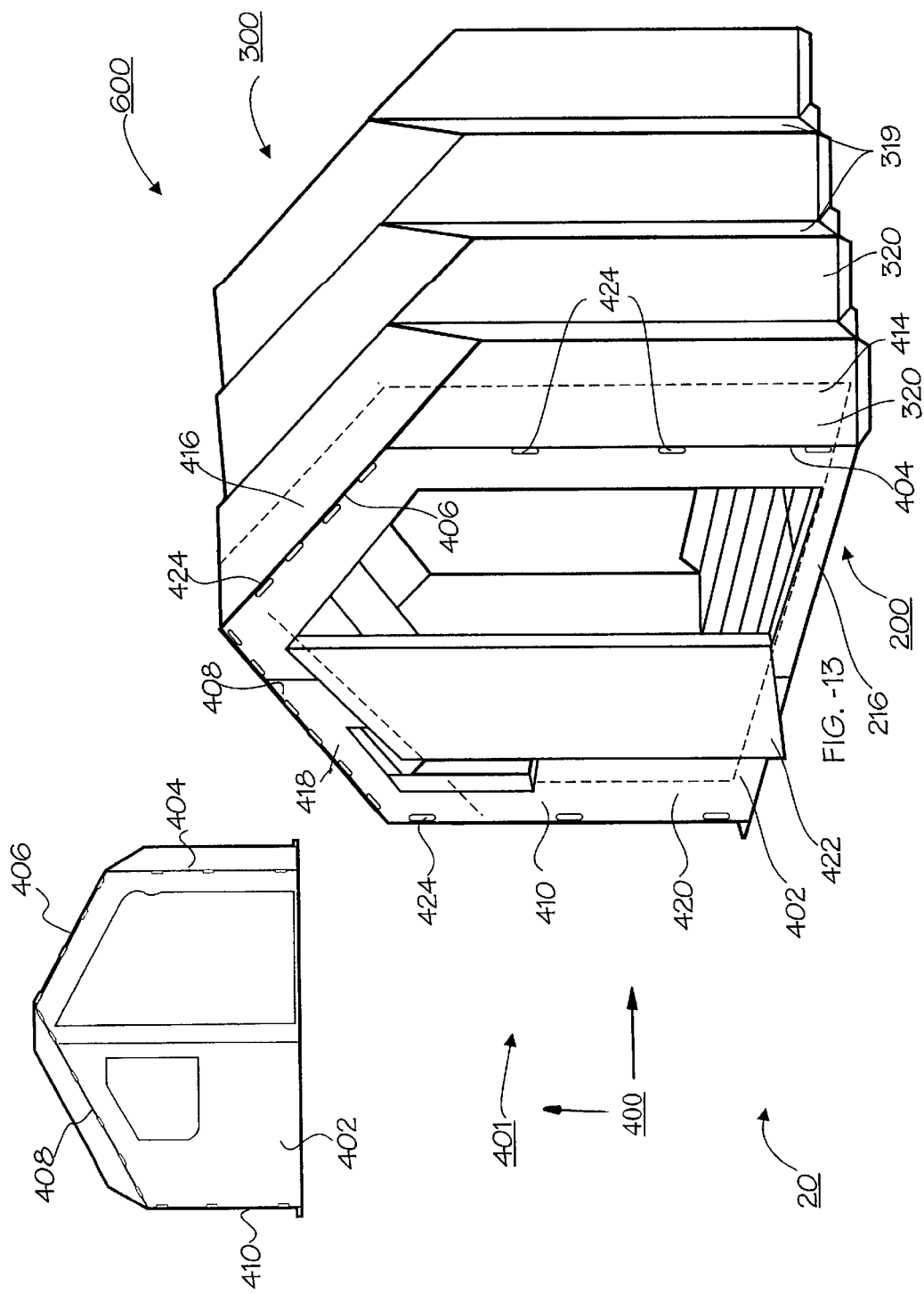
FIG. 13 is a schematic perspective view of collapsible shelter 20 including tunnel section 600, tunnel member 300 connected to floor section 200 and also including a first end wall.

Relating to the First End Wall and the Manner of its Attachment to the Tunnel Member As best seen in FIG. 13, the main body section 402 of the first rigid end wall 400 has a plurality of mounting flap portion 401 (shown in hidden lines), comprising a first side flap portion 414, a first slanted roof portion 416, a second slanted roof flap portion 418, and a second side flap portion 420, and a base flap portion 422.

The first side flap portion 414 (shown in hidden lines) of the first end wall 400 rigidly extends from the first side edge 404 of the main body section 402 such that a mounting surface 415 thereof is substantially flush with the respective one of the second wall panels 320 positioned immediately adjacent the front edge 202 of the floor section 200.

The first slanted roof flap portion 416 (shown in hidden lines) of the first end wall 400 rigidly extends from the first slanted edge 406 of the main body section 402 so as to substantially overlap and be flush against the respective one of the second roof panels 360 positioned in said end-to-end relation with said respective one of the second wall panels 320 positioned immediately adjacent the front edge 202 of the floor section 200 thereby to contribute to the rigid, releasable attachment of the end wall 400 to the tunnel member 300.

The second slanted roof flap portion 418 (shown in hidden lines) of the first end wall 400 rigidly extends from the second slanted edge 408 of the main body section 402 so as to substantially overlap and be flush against the respective one of the fourth roof panels 380 positioned in said end-to-end relation with the respective one of the second roof panels 360 positioned in said end-to-end relation with said respective one of the second wall panels 320 positioned immediately adjacent the front edge 202 of the floor section 200 thereby to contribute to the rigid, releasable attachment of the end wall 400 to the tunnel member 300.

The second side flap portion 420 (shown in hidden lines) of the end wall 400 rigidly extends from the second side edge 410 of the main body section 402 such that mounting surface 405 thereof is substantially flush with the respective one of the fourth wall panels 340 positioned in said end-to-end relation with said respective one of the fourth roof panels 380 positioned in said end-to-end relation with the respective one of the second roof panels 360 positioned in said end-to-end relation with said respective one of the second wall panels 320 positioned immediately adjacent the front edge 202 of the floor section 200.

A base flap portion 422 (shown in hidden lines) of the end wall 400 rigidly extends from the base edge 412 of the main body section 406 so as to be substantially flush with the mounting area 216 of the upper surface 212 of the floor section 200.

A plurality of clip slots 424 are provided in said end wall 400 along the first side edge 404, the first slanted edge 406, the second slanted edge 408 and the second side edge 410, said clip slots 424 being respectively associated with the first side flap portion 414, the first slanted roof flap portion 416, the second slanted roof flap portion 418 and the second side flap portion 420.

A plurality of clip member 426 are also provided. As illustrated in FIG. 43, which is a sketch of a clip member 426, in a cross-section, showing a respective one of the clip members 426 extending through a notional slot "C" in a notional first panel member "A", and in frictional, gripping engagement of a notional second panel member "B", the clip members 426 each comprise abridge portion 426A, a substantially planar first arm portion 426B, and a substantially planar second arm portion 426C, said first arm portion 426B and said second arm portion 426C extending from said bridge portion 426A substantially parallel to and spaced-apart from one another to respective ends 426D, 426E. The bridge portion 426A, first arm portion 426B and second arm portion 426C collectively define an interior channel 426F. The first arm portion 426B has a flange portion 426G extending outwardly therefrom, adjacent the end 426D thereof. The second arm portion 426C has a plurality of barb portions 426H extending into said interior channel 426F, and flares outwardly slightly towards its end 426E.

Each of said clip members 426 has the first arm potion 426B thereof positioned within a respective one of the plurality of clip slots 424 and the second arm portion thereof 426C positioned in overlapping relation relative to the respective one of the mounting flap portions 401 with which said respective clip slot 424 is associated. The flange portion 426G prevents inadvertent removal of the clip member 426 from the clip slot 424 within which it is positioned, such that the clip members 426 are held captive to the end wall 400.

The clip members 426 which are provided in said end wall 400 along the first edge 404 have their respective second arm portions thereof 426C positioned in overlapping relation relative to the said respective one of the second wall panels 320 positioned immediately adjacent the front edge 202 of the floor section 200 such that the barb portions 426H respectively extending from said second arm portions 426C frictionally engage said respective second wall panel 320 thereby to contribute to the rigid, releasable attachment of the end wall 400 to the tunnel member 300.

The clip members 426 which are provided in said end wall 400 along the first slanted edge 406 have their respective second arm portions thereof 426C positioned in overlapping relation relative to the respective one of the second roof panels 360 positioned in said end-to-end relation with said respective one of the second wall panels 320 positioned immediately adjacent the front edge 202 of the floor section 200 such that the barb portions 426H respectively extending from said second arm portions 426C frictionally engage said respective second roof panel 360 thereby to contribute to the rigid, releasable attachment of the end wall 400 to the tunnel member 300.

The clip members 426 which are provided in said end wall 400 along the second slanted edge 408 have their respective one of the fourth roof panels 380 positioned in said end-to-end relation with the respective one of the second roof panels 360 positioned in said end-to-end relation with said respective one of the second wall panels 320 positioned immediately adjacent the front edge 202 of the floor section 200 such that the barb portions 426H respectively extending from said second arm portions 426C frictionally engage said respective fourth roof panel 380 thereby to contribute to the rigid, releasable attachment of the end wall 400 to the tunnel member 300.

The clip members 426C which are provided in said end wall 400 along the second side edge 410 have their respective second arm portions thereof 426C positioned in overlapping relation relative to said respective one of the fourth wall panels 340 being positioned in said end-to-end relation with said respective one of the fourth roof panels 380 positioned in said end-to-end relation with the respective one of the second roof panels 360 positioned in said end-to-end relation with said respective one of the second wall panels 320 positioned immediately adjacent the front edge 202 of the floor section 200 such that the barb portions 426H respectively extending from said second arm portions 426C frictionally engage said respective fourth roof panel 380 thereby to contribute to the rigid, releasable attachment of the end wall 400 to the tunnel member 300.

Relating to the Second End Wall and the Manner of its Attachment to the Tunnel Members The second end wall not shown is in all respects identical to the first end wall 400 and is attached to the tunnel member 300 in a manner in all respects analogous to the manner in which the first end wall 400 is selectively, rigidly releasably attached to said tunnel member 300 and to said floor section 200.

Alternate Clip Members

Referring now to FIGS. 28 through 33 showing an alternate u shaped clip member 502 which is comprised of first arm 505, second arm 506 and bridge portion 508, first barb 510, second barb portions 512, first end 514 and second end 516. Note that second barb portions 512 and first barb 510 are rubberized to ensure grip onto the panel members. Clip member 502 functions in similar manner as described by clip member 426.

Referring now to FIGS. 8 through 12, clip member 502 is used for connection of window panel 480 with door panel 482 along first side 484 and 486 respectively. First end wall 400 is made by joining two panels, namely window panel 480 with door panel 482 which is joined along first sides 484 and 486 using the arrangement shown in FIG. 11, wherein at numerous locations along first side 484 and 486, clip member 502 is placed to fasten window panel 480 together with door panel 482.

Alternate Embodiment for Clip Member

Referring now to FIGS. 34 through 42, alternate embodiment is shown of clip member shown generally as 552 is comprised of first arm 554, second arm 556, bridge portion 558, first barb 560, second barb 562, with second arm 556 having a first end 564 and first arm 554 having a second end 566 having a hook portion 568.

First barb 560 and second barb 562 preferably are a resilient rubber material for gripping onto a roof and wall panels. Clip member 552 functions in a similar manner as clip member 426 with the additional hook portion 568.

Referring now to FIGS. 40 through 42 which show clip member 552 in situ, FIG. 40 for example shows clip member 502 in a fastened position 570, clamping generally panel A to panel B which for example can be first wall 400 to second wall panel 320.

In order to position clip member 552 in FIGS. 41 and 42, hook portion 568 of second end 566 which is connected to first arm 554 is carefully threaded through a clip slot 424 and thereafter the entire clip member 552 is pushed into a fastened position 570 as shown in FIG. 40. In order to release clip member 552 it is urged backwardly in direction 590 until second barbs 562 and first barb 560 are released from second wall panel 320 and end wall 400.

When clip member 552 is released, hook portion 568 remains engaged through clip slots 424 thereby hanging in the disengaged or unfastened position shown as 572. In this manner even when clips are disengaged or unfastened, they are not lost, but held in the appropriate clip slot 424 ready for use at any time.

Soft End Walls

Referring now to FIGS. 14, 15 and 16, showing soft end wall 700 which is comprised of flexible material 740 such as canvass, nylon, polyester, polyprothene, cotton and/or other flexible materials and is attached to the front edges 316, 356, 376 and 336 of the wall and roof panels as well as front edge 202 of floor section 200.

The attachment of flexible materials 740 to the stiffer wall, roof and floor sections is accomplished by using frame portion 702 which preferably are U-channels 730. Flexible material 740 is clamped onto, for example, front edge 336 of wall panel 340 and roof panel 380 respectively. Therefore as shown in FIGS. 14, 15 and 16, five U-channel 730 sections or five frame portions 702 are required for attaching flexible material 740 to the wall panels, roof panels or floor panels of collapsible shelter 20. An important feature of the attachment of flexible material 740 to the more rigid wall, roof and floor sections is the use of soft corners 720, wherein the U-channels 730 do not extend around soft corner 720 in order to ensure that collapsible shelter 20 retains its collapsibility without having to remove soft end wall 700. Therefore, when collapsible shelter 20 is collapsed along its pleats, as shown in FIGS. 19 through 25, the soft end wall 700 simply hinges and/or folds about soft corner 720 corresponding to the pleats and/or folding points of the end walls, roof panels and floor section. Preferably, soft end wall 700 also includes zipper 710 shown in dashed line for entry and exit out of collapsible shelter 20. Although not shown, a similar end wall can be attached to the rear portion of collapsible shelter 20 and attached in analogous and/or similar fashion as described here above.

In Use

Outside Folding Flaps

An important feature of the present invention are outside folding flap 801 portions which will be described here below. These outside folding flap 801 portions allow collapsible shelter 20 to be collapsed to almost the thickness of the material which is being folded. In addition, the outside folding flap 801 portion also provides for ease of manufacture and eliminates the necessity of having to remove the floor section 200 from the wall and the roof portion ie. tunnel member 300 in order to obtain good collapsibility of the structure. Tunnel member 300 mounted to floor panel 200 defines an interior space 217. The outside folding flaps are exterior of the interior space 217.

As illustrated in FIG. 2 the flat tunnel panel 90 which forms the pleated tunnel member 300 is pre-scored, and may be folded into the tunnel member 300 about said scores. Preferably, the flat tunnel panel 90, as well as the other components of the COLLAPSIBLE SHELTER 20, comprise panels of corrugated polypropylene. In one embodiment of the present invention, the components are formed from transparent corrugated polypropylene, for use as a greenhouse. Once folded, the flat tunnel panel 90 is simply rivetted to the floor section 200 as shown in FIGS. 26 and 27.

Tunnel panel 90 includes parallel longitudinal creases 850 running in the longitudinal direction 805, saw tooth roof peak creases 852 running in the transverse direction 807, and first and second saw tooth wall-roof junction creases 854, 856 also running along the transverse direction 807.

Tunnel panel 90 also includes 1st and 2nd side creases 802 & 804, flap portions 392, V cuts 806, linear cuts 808, fastening apertures 821, and flap ends 820 and 822.

Referring now to FIGS. 2 and 26 which shows a portion of lower end 312 of upright pleated wall section 310 which is comprised of second upright wall panel 320, mounted in side by side relationship with first upright wall panels 319, wherein second wall panel 320 has near the lower end 312 a first end edge 325 and first upright wall panel 319 has at lower end 312 a first end edge 321.

Tunnel member 300 has at lower end 312 a first side crease shown in dotted lines as 802. In addition, the flap portions 392 have defined therein a V cut 806 and a linear cut 808 arranged in alternating side by side fashion. The ends of linear cut 808 are defined as flap ends 820 and the ends of v-cut 806 are shown as flap ends 822.

Referring now to floor section 200, in FIG. 1 the side edges 206 and 208 of floor section 200 have defined therein inner V corners 812 and outer V corners 814, arranged in alternating side by side fashion.

When tunnel member 300 is erected and mounted on to floor section 200, referring now FIGS. 2, 26 and 27 flap portions 392 have flap ends 820 defined by linear cut 808 which open up as shown in FIG. 26 to define outer V corner 814 when viewed from above. Conversely flap portions 392 also have flap ends 822 defined by V cut 806 which come together and close off to meet each other to form inner v-corner 812 defined in floor section 200. Therefore, when tunnel member 300 is erected and pleated, v-cuts 806 close off such that flap ends 822 come in contact with each other forming inner V corners 812, whereas linear cuts 808 open up such that flap ends 820 form outer v-corner 814. This arrangement ensures that when collapsible shelter 20 is collapsed with floor member 200 attached. Collapsing of the shelter is accomplished in accordion pleated fashion with a minimum of stack height. The V cuts 806 and linear cuts 808 in tunnel panel 90 assure the collapsibility of tunnel section 600 when attached to floor 200.

Flap portions 392 of the wall panels are connected to the floor section 200 via fasteners shown as 824 which preferably are rivets having large washer mounted on the top and bottom thereof. This detail is best viewed in FIG. 27.

Collapsing Collapsible Shelter
Soft Side Walls

FIGS. 18 through 25 show the sequence of collapsing the collapsible shelter 20 which is comprised of tunnel member 300 attached to floor section 200 and as well may include soft end wall 700 attached on both ends. First of all the collapsible shelter is tilted onto one pleated wall section as shown in FIG. 19 and the axial crease 211 of floor section 200 is folded inwardly as shown. This has the effect of pivoting flap portion 392 nearly parallel to the wall panels. The lower ends of the pleated wall panels almost meet each other. Once the roof and wall sections are in the collapsing position 974, and the floor is in the floor folded position 970, the entire pleated structure will collapse on itself like an accordion when it is set on end into the folded position 979. Note that although FIGS. 19 through 25 do not show end wall 700 in place, it is possible to have soft end wall 700 in place. The end walls simply fold in on themselves with the rest of the structure. In folded position 979 the wall panels, floor panels, roof panels are all folded onto each other to produce a collapsed shelter 972 having a very low stack height. It is not necessary to remove the soft end walls 700 to collapse the shelter 20.

Collapsing Shelter with Rigid End Walls 400

It is necessary to first remove end walls 400, 500 (not shown) from the ends 390, 391 of the tunnel member 300. The floor section 200 is foldable about the floor creases 220 and axial crease 211 defined thereupon, and the first wall panels 319, second wall panels 320, third wall panels 339, fourth wall panels 340, first roof panels 359, second roof panels 320, third wall panels 339, fourth wall panels 340, first roof panels 359, second roof panels 360, third roof panels 379 and fourth roof panels 380 are positionable relative to one another by virtue of their flexible attachment, as previously discussed, and as illustrated in FIGS. 18 to 25, into a storage configuration shown as folded position 979.

In the storage configuration or folded position 979 of the tunnel section 600, the first wall panels 319 and second wall panels 320 are substantially stacked upon one another and coplanar; the third wall panels 339 and fourth wall panels 340 are substantially stacked upon one another and coplanar; the first roof panels 359 and second roof panels 360 are substantially stacked upon one another and coplanar; the third roof panels 379 and fourth roof panels 380 are substantially stacked upon one another and coplanar; and the substantially rectangular portions 203 of the floor section 200 are substantially stacked upon one another and coplanar. In such storage configuration, the tunnel section 600 is readily packable in a compact manner, for subsequent transport.

This sequence of folding also applies to collapsible shelter 20 having soft end walls 700 in place.

It will, of course, be evident to persons skilled in the art that the COLLAPSIBLE SHELTER may be assembled and erected from its constituent components in a manner analogous to the manner of its disassembly, by the simple reversal of steps. It will also be evident to persons skilled in the art that the COLLAPSIBLE SHELTER of the present invention might be combined into longer units.

Building Construction

Figure 17:
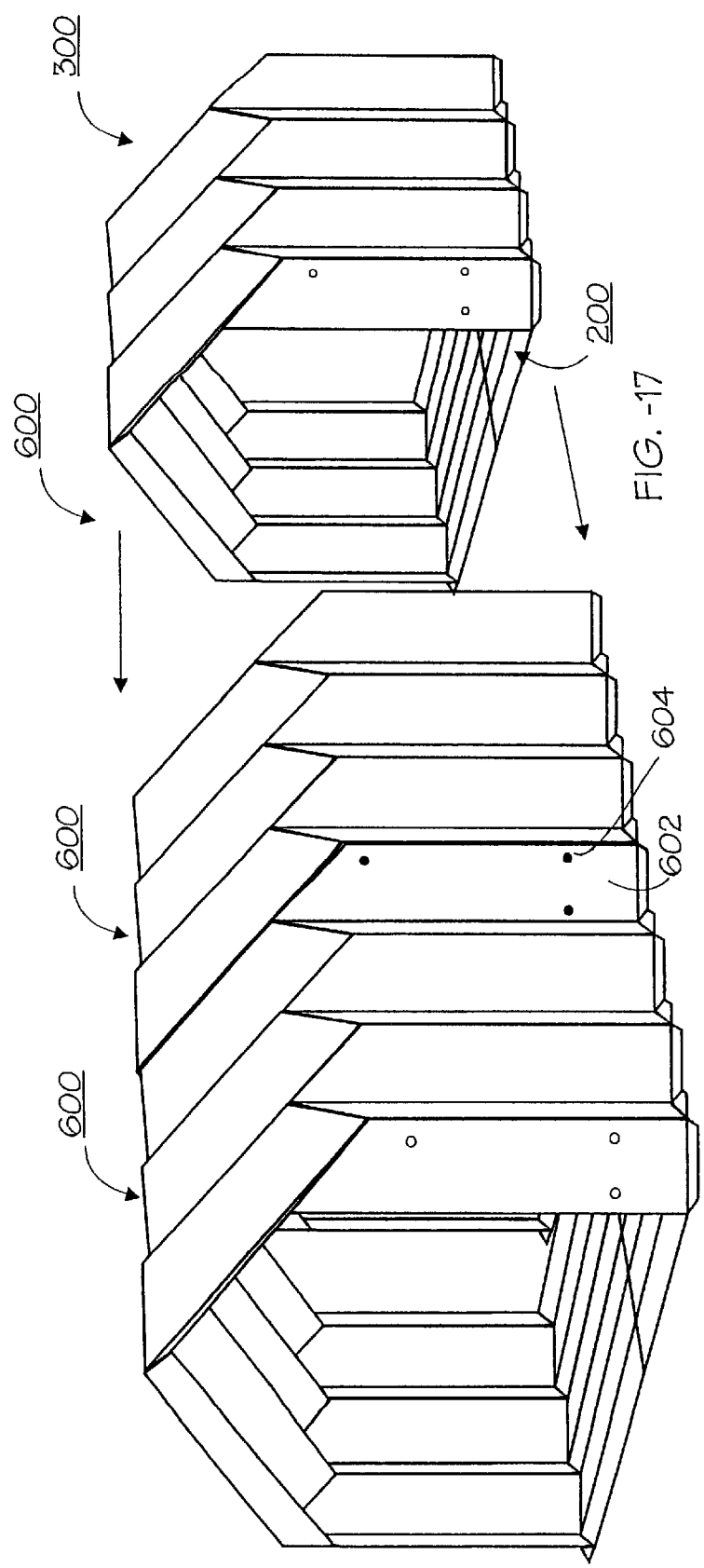
FIG. 17 is a schematic perspective exploded view of tunnel section 600 being assembled together.

Referring now to FIGS. 6 and 17, kindly note that the collapsible shelter 20 comprises of multiple tunnel sections 600 as shown in FIG. 17. A tunnel section 600 is comprised of a tunnel member 300 and a floor section 200 which are fastened together using the outside folding flap technology described above. Multiple tunnel sections 600 can be connected together end to end via a single panel overlap 602 and rivet fasteners 604 shown in FIGS. 6 and 17. Collapsible shelter 20 can be one tunnel section 600 or can be any number of tunnel section 600 depending upon the length of the building one desires. In addition, end walls can be attached such as stiff end wall 400 described above and/or soft end wall 700 as described above. Note that if a stiff end wall 400 is chosen, then these end walls must first be removed prior to collapsing the building. However, if soft end wall 700 is used then the building can be collapsed without the necessity of removing soft end wall 700.

It should be apparent to persons skilled in the arts that various modifications and adaptation of this structure described above are possible without departure from the spirit of the invention the scope of which defined in the appended claim.

We claim:

1. A collapsible shelter comprises:
   (a) spaced apart first and second upright pleated wall sections disposed substantially parallel to each other;

(b) first and second slanted pleated roof sections joined at upper ends to form a saw tooth roof peak, and joined at lower ends to upper ends of said wall section to form saw tooth wall-roof junctions;

(c) wherein said pleated wall sections together with said pleated roof sections form a tunnel member which is collapsible by folding said pleated sections onto each other in accordion style;

(d) a flat floor panel having straight parallel longitudinal creases defining floor panels, each floor panel operably corresponding to a wall panel;

(e) said floor further including an axial crease along an axis running in a transverse direction;

(f) wherein said flat floor panel is connected to lower ends of said wall section defining a tunnel section and collapses together with said tunnel member in accordion style, to a collapsed position, by firstly folding said floor along said axial crease, prior to folding said pleated sections onto each other.

2. The collapsible shelter claimed in claim 1, wherein said floor panel is attached to said wall sections exterior to said tunnel member creating an outside wall to floor attachment.

3. The collapsible shelter claimed in claim 2, wherein said floor panel is attached to outside flap portions pivotally connected to said lower ends of said wall sections.

4. The collapsible shelter claimed in claim 3, wherein said wall to floor attachment comprises:

(a) flap portions defined along lower ends of said wall panels, (b) corresponding mounting portions defined proximate saw tooth side edges of said floor panel, whereby said flap portions are fastened to said mounting portions.

5. The collapsible shelter claimed in claim 4, wherein said mounting portions are separated by alternate inner and outer v corners along each saw tooth side edge.

6. The collapsible shelter claimed in claim 5, wherein said flap portions and mounting portions correlate and match adjacently together and include fasteners there through for securing said tunnel member to said floor panel.

7. The collapsible shelter claimed in claim 1, wherein said collapsible shelter is collapsed by:

(a) folding in half said floor panel along said axial crease such that said floor halves fold inwardly into the interior of said tunnel member into a floor folded position;

(b) folding together said pleated wall and roof sections and said floor panels in accordion fashion until all wall, roof and floor panels are stacked upon each other creating a compact portable collapsed shelter, in said collapsed.

8. The collapsible shelter claimed in claim 1, further comprising at least one soft end wall secured to a front edge of said floor wall and roof sections, such that said end wall is flexible and attached in such a manner that it remains attached in the collapsed position.

9. The collapsible shelter claimed in claim 8, wherein said soft end wall is attached with u-channel frame portions clamping together flexible material of said soft end wall and front edges of said walls, roof and floor without interfering with collapsibility of said shelter.

10. The collapsible shelter claimed in claim 9, wherein said U-channel frame portions define soft corners to aid in collapsing of shelter.

11. The collapsible shelter claimed in claim 1, further comprising at least one rigid end wall secured to a front edge of said floor with wall flap portions and clip members clamping said flap portions to said wall, roof or floor panels.

12. The collapsible shelter claimed in claim 10, wherein said clip member being U shaped having a first arm passing through a clip slot in said rigid end wall clamping onto said flap portion of said wall and a second arm clamping onto said wall roof or floor panel such that said flap portion and tunnel panel are clamped together.

13. The collapsible shelter claimed in claim 10, wherein preferably said clip member includes rubberized barbs attached to at least one of said arms for gripping securely within said U-channel said panels.

14. The collapsible shelter claimed in claim 10, wherein preferably said first arm includes a hooked portion at a second end such that in an unfastened position said hooked portion retains said clip member partially within said clip slot.

* * * * *